United States Patent
Kim et al.

(10) Patent No.: US 9,030,590 B2
(45) Date of Patent: May 12, 2015

(54) PHOTOGRAPHING APPARATUS AND METHOD

(75) Inventors: Sang-tae Kim, Suwon-si (KR);
Dae-myung Kim, Hwaseong-si (KR);
Toshikazu Takayanagi, Suwon-si (KR);
Jong-hoon Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 13/547,284

(22) Filed: Jul. 12, 2012

(65) Prior Publication Data

US 2013/0100332 A1    Apr. 25, 2013

(30) Foreign Application Priority Data

Oct. 21, 2011    (KR) ........................ 10-2011-0108117

(51) Int. Cl.
| | |
|---|---|
| H04N 5/225 | (2006.01) |
| H04N 9/07 | (2006.01) |
| G03B 19/12 | (2006.01) |
| H04N 5/232 | (2006.01) |
| H04N 5/238 | (2006.01) |
| G03B 13/36 | (2006.01) |

(52) U.S. Cl.
CPC ................ *G03B 19/12* (2013.01); *G03B 13/36* (2013.01); *H04N 5/2254* (2013.01); *H04N 5/23293* (2013.01); *H04N 5/238* (2013.01)

(58) Field of Classification Search
CPC .................................................. H04N 5/23212
See application file for complete search history.

(56) References Cited

U.S. PATENT DOCUMENTS

| | | | |
|---|---|---|---|
| 4,949,117 A * | 8/1990 | Van Heyningen et al. ..... | 396/100 |
| 6,781,632 B1 | 8/2004 | Ide | |
| 6,819,360 B1 * | 11/2004 | Ide et al. ........................ | 348/340 |
| 7,405,762 B2 | 7/2008 | Nonaka et al. | |
| 7,889,268 B2 | 2/2011 | Terada | |
| 2004/0057712 A1 | 3/2004 | Sato et al. | |
| 2005/0168621 A1 * | 8/2005 | Kageyama et al. ........... | 348/349 |
| 2007/0206940 A1 | 9/2007 | Kusaka | |
| 2009/0128663 A1 * | 5/2009 | Seto .......................... | 348/231.99 |
| 2009/0168154 A1 * | 7/2009 | Irie ............................... | 359/359 |
| 2010/0104271 A1 * | 4/2010 | Park et al. ..................... | 396/111 |
| 2010/0188522 A1 | 7/2010 | Ohnishi et al. | |
| 2011/0164157 A1 | 7/2011 | Katsuda | |
| 2011/0273599 A1 | 11/2011 | Murata | |
| 2013/0002925 A1 * | 1/2013 | Lin ......................... | 348/333.08 |

FOREIGN PATENT DOCUMENTS

| | | |
|---|---|---|
| JP | 09-203974 A | 8/1997 |
| JP | 2009-164844 A | 7/2009 |
| JP | 2011-139325 A | 7/2011 |
| KR | 10-2011-0027120 A | 3/2011 |

OTHER PUBLICATIONS

PCT Search Report and Written Opinion established for PCT/KR2012/006595 (Jan. 29, 2013).
Search Report established for EP 12188740.0 (Jan. 22, 2013).

* cited by examiner

*Primary Examiner* — Lin Ye
*Assistant Examiner* — John H Morehead, III
(74) *Attorney, Agent, or Firm* — Drinker Biddle & Reath LLP

(57) ABSTRACT

A photographing apparatus includes: a lens unit; a light transmission adjustment unit that adjusts light transmittance of light that passes through the lens unit; a photographing unit that is disposed a reflected light path of the light transmission adjustment unit and that generates an image data according to received light, and a view finder that is disposed on a transmitted light path of the light transmission unit.

23 Claims, 8 Drawing Sheets

PHOTOGRAPHING APPARATUS AND METHOD

CROSS-REFERENCE TO RELATED PATENT APPLICATIONS

This application claims the priority benefit of Korean Patent Application No. 2011-0108117, filed on Oct. 21, 2011, in the Korean Intellectual Property Office, the disclosure of which is incorporated herein in its entirety by reference.

BACKGROUND

1. Field

One or more embodiments relate to a photographing apparatus and method, and more particularly, to a photographing apparatus that may have a simple configuration and in which various functions, such as an image-capturing function, a view finder function, and the like, may be selected and performed and a method thereof.

2. Description of the Related Art

Photographing apparatuses, such as cameras or camcorders, have an image-capturing function of capturing an image of a subject and a view finder function of previewing an image of a subject to be captured. As technology pertaining to photographing apparatuses is developed, both the image-capturing function and the view finder function are developed. However, when implementing an advanced function in a photographing apparatus, a number of components are added to the photographing apparatus, resulting in a complicated configuration.

PRIOR-ART LITERATURE

Patent Literature

Japanese Patent Application Publication No. 1997-203974 discloses a mirror operating assembly that operates to change an installation position so as to implement an image-capturing function and a view finder function. According to the disclosure, a photographing apparatus in which an image-capturing function and a view finder function may be selected and performed may be implemented, but requires a driving device having a complicated mechanism for operating a mirror and thus the photographing apparatus has increased volume, and manufacturing thereof is difficult.

SUMMARY

One or more embodiments include a photographing apparatus having a simple configuration and in which various functions may be selected and performed and a method thereof.

One or more embodiments also include a photographing apparatus in which an auto-focusing (AF) function may be quickly performed without having to install an additional mechanism and a method thereof.

According to an embodiment, a photographing apparatus includes: a lens unit; a light transmission adjustment unit that is disposed on an optical axis on which light that passes through the lens unit proceeds and is inclined with respect to the optical axis, and receives light that passes through the lens unit and transmits the light with adjusted light transmittance; an photographing unit that is disposed on a reflected light path on which light that is reflected by the light transmission adjustment unit proceeds and that generates an image data according to received light; and a view finder unit that is disposed on a transmitted light path on which light that passes through the light transmission adjustment unit proceeds and displays an image formed by the light that passes through the light transmission adjustment unit.

The light transmission adjustment unit may include one selected from the group consisting of an electrochromic device, a liquid crystal device, a suspended particle device, a photochromic device, and a thermochromic device.

The photographing apparatus may further include a reflection unit that is disposed between the view finder unit and the light transmission adjustment unit and is inclined with respect to the transmitted light path so as to reflect some light; and a phase detection unit that receives the reflected light from the reflection unit and detects a phase difference between images formed by the reflected light.

The reflecting unit may include one selected from the group consisting of an electrochromic device, a liquid crystal device, a suspended particle device, a photochromic device, and a thermochromic device.

The light transmission adjustment unit and the reflection unit may be inclined with respect to an optical axis of the lens unit in opposite directions so that light that is reflected by the light transmission adjustment unit and light that is reflected by the reflection unit proceed in different directions.

The view finder unit may include an optical element that focuses light that passes through the light transmission adjustment unit to form the image of the view finder.

The view finder unit may further include a transparent display that is disposed at a position at which an image is formed by light that passes through the light transmission adjustment unit and that displays the image formed by the light that passes through the light transmission adjustment unit or an image formed in response to a signal applied from outside.

The view finder unit may include an eyepiece that is disposed at a position at which an image is formed by the light that passes through the light transmission adjustment unit and that displays the image formed by the light that passes through the light transmission adjustment unit.

The view finder unit may further include a light blocking unit that blocks out light entering the photographing apparatus.

The photographing apparatus may further include an image information display unit that is disposed adjacent to the view finder unit and that displays image information in response to a signal applied from outside.

The view finder unit may include a prism unit that transfers some of the light that passes through the light transmission adjustment unit in a first direction of the view finder unit and transfers a remaining portion of the light that passes through the light transmission adjustment unit in a second direction at an angle different from an angle of a path of light that is transferred from the light transmission adjustment unit The photographing apparatus may further include a phase detection unit that receives light transferred from the prism unit and detects a phase difference between images formed by the transferred light from the prism unit.

The view finder unit may include an eyepiece that is disposed at a position at which an image is formed by the light transferred front the prism unit in the first direction and that displays the image formed by the light transferred front the prism unit in the first direction.

The view finder unit may further include a transparent display that is disposed at a position at which an image is formed by the light transferred front the prism unit in the first direction and that displays the image formed by the light transferred front the prism unit in the first direction or an image formed in response to a signal applied from outside.

The photographing apparatus may further include a controller that is electrically connected to the light transmission adjustment unit and the photographing unit and that controls the light transmission adjustment unit and the photographing unit, wherein the controller adjusts light transmittance of the light transmission adjustment unit by applying a signal to the light transmission adjustment unit.

The controller may control the light transmission adjustment unit to operate the light transmission adjustment unit in one of a total reflection mode in which the light transmission adjustment unit reflects light that passes through the lens unit, a transmission mode in which the light transmission adjustment unit transmits light that passes through the lens unit, and a partial reflection mode in which the light transmission adjustment unit reflects only some of light that passes through the lens unit.

The controller may control the photographing unit to capture a moving picture image or a still image, and the controller may control the light transmission adjustment unit in one of the total reflection mode and the partial reflection mode so that light is transferred to the photographing unit while the moving picture image is captured by the photographing unit.

The photographing apparatus may further include a main body that surrounds the photographing unit and the light transmission adjustment unit, wherein the light transmission adjustment unit is inclined so as to reflect light toward one among four sides of the main body, and the photographing unit may be disposed on one among the four sides of the main body so as to receive light that is reflected by the light transmission adjustment unit.

The photographing apparatus may further include a reflection unit that is disposed on the reflected light path and inclined with respect to the reflected light path and that reflects some of the light reflected from the light transmission adjustment unit and transmits a remaining portion of the light reflected from the light transmission adjustment unit; and a phase detection unit that receives the light transmitted from the reflection unit and detects a phase difference between images formed by the light transmitted from the reflection unit, wherein the photographing unit may receive the light reflected from the reflection unit.

The photographing apparatus may further include a reflection unit that is disposed on the transmitted light path on which light that passes through the light transmission adjustment unit proceeds and inclined with respect to the transmitted light path so as to reflect some light and transmit a remaining portion of light; and a phase detection unit that receives the light transmitted from the reflection unit and detects a phase difference between images formed by the light transmitted from the reflection unit, wherein the viewfinder unit may receive the light reflected from the reflection unit.

According to another embodiment, a photographing method includes: adjusting light transmittance of a light transmission adjustment unit that is disposed on an optical axis on which light that passes through a lens unit proceeds; and generating an image data by converting light that is transferred from the light transmission adjustment unit by using a photographing unit that is disposed on a reflected light path on which light that is reflected from the light transmission adjustment unit proceeds.

The photographing method may further include displaying an image that is formed by light transferred from the light transmission adjustment unit on a view finder unit that is disposed on a transmitted light path on which light that passes through the light transmission adjustment unit proceeds.

BRIEF DESCRIPTION OF THE DRAWINGS

The above and other features and advantages will become more apparent by describing in detail exemplary embodiments with reference to the attached drawings in which.

DETAILED DESCRIPTION

Embodiments will now be described more fully with reference to the accompanying drawings, in which exemplary embodiments are shown.

Figure 1:
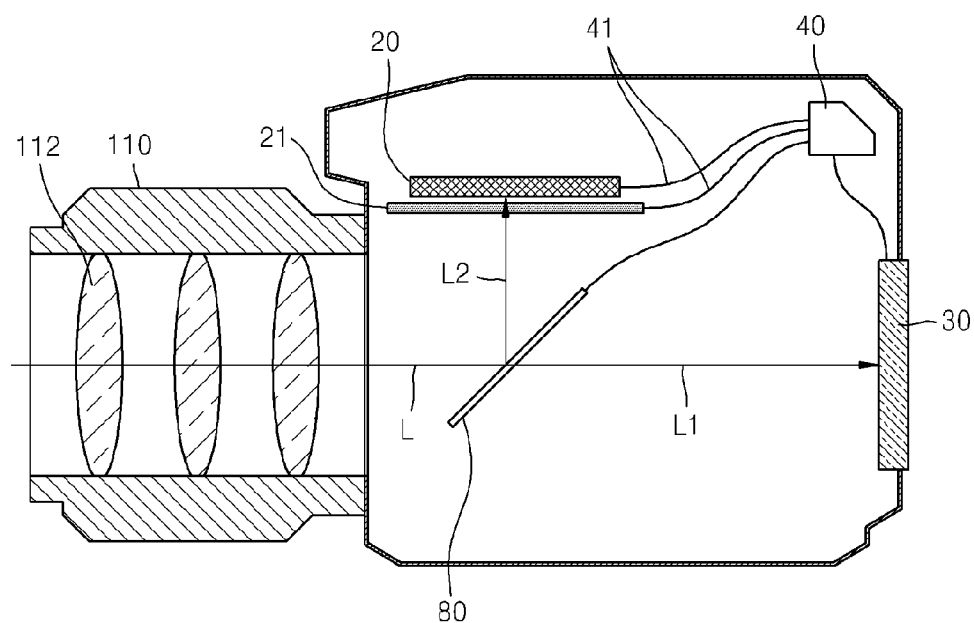
FIG. 1 is a schematic view of elements of a photographing apparatus, according to an embodiment.

FIG. 1 is a schematic view of elements of a photographing apparatus, according to an embodiment.

Referring to FIG. 1, the photographing apparatus according to the current embodiment includes a lens unit 110, a light transmission adjustment unit 80 that is disposed to be inclined with respect to an optical axis L on which light that passes through the lens unit 110 proceeds, an image sensor 20 that is disposed on a reflected light path L2 on which light that is reflected by the light transmission adjustment unit 80 proceeds, and a view finder unit 30 that is disposed on a transmitted light path L1 on which light that passes through the light transmission adjustment unit 80 proceeds and displays an image formed by the light that passes through the lens unit 110. The lens unit 110 includes a plurality of lenses 112.

A photographing apparatus according to one or more embodiments may be implemented as a variety of types of photographing apparatuses, such as digital still cameras that capture a still image, or digital video cameras that capture a moving picture image.

In the current embodiment, the image sensor 20 is an example of a photographing unit that receives light and generates an image data. The image sensor 20 is disposed on the reflected light path L2 on which the light that is reflected by the light transmission adjustment unit 80 proceeds. A shutter 21 may be disposed in front of the image sensor 20 on the reflected light path L2.

The image sensor 20 includes a photoelectric transformation element, such as a charge-coupled device (CCD) or a complementary metal oxide semiconductor (CMOS), and transforms incident image light that passes through the lens unit 110 into an electrical signal in order to generate the image data.

The shutter 21 blocks out light that is incident on the image sensor 20. The shutter 21 may be implemented to block out light using an optical variation of a liquid crystal device or using a mechanical shutter device.

Various embodiments are not required to include the shutter 21, and thus the shutter 21 may be omitted. When the shutter 21 is removed from the photographing apparatus of FIG. 1, the light transmission adjustment unit 80 may replace the shutter 21. That is, the light transmission adjustment unit 80 may reflect light toward the image sensor 20 only for a time required for an exposure operation of the image sensor 20, and when the exposure operation of the image sensor 20 is terminated, the light transmission adjustment unit 80 may transmit light toward the view finder unit 30 so that a shutter function for the image sensor 20 may be implemented without using the shutter 21.

The view finder unit 30 performs a function of providing an image of a subject to be captured, to a user of the photographing apparatus so as to perform framing for capturing an image and a focusing operation. In the current embodiment, the view finder unit 30 is disposed on a straight line extending from the transmitted light path L1 on which the light that passes through the lens unit 110 proceeds.

The view finder unit 30 may be implemented using an optical element, such as a transparent plate or an eyepiece, so as to display an image that is formed by the light that passes through the lens unit 110. Alternatively, the view finder unit 30 may include a transparent display that is disposed at a position at which an image is formed by the light that passes through the light transmission adjustment unit 80. The position at which an image is formed by the light that passes through the light transmission adjustment unit 80 means a focal plane on which an image is formed.

The transparent display performs both a function of transmitting light and a function of displaying an image. For example, the transparent display may be implemented using a liquid crystal display (LCD) device that transmits light by using a transparent electrode and displays an image when a signal is applied to the LCD device, or by using an active matrix organic light emitting diode (AMOLED) having self-light emitting pixels.

When the view finder unit 30 is implemented using the transparent display, both an optical view finder (OVF) function and an electronic view finder (EVF) function may be performed using the view finder unit 30.

The EVF function is a function of displaying a live view image by transmitting an image signal that is obtained by the image sensor 20 to the view finder unit 30 from a control unit 40, thereby displaying the live view image. The OVF function is a function of forming an image on the view finder unit 30 by using the light that passes through the lens unit 110 and displaying the image so that the user may observe the image.

Referring to FIG. 1, an image may be formed on the view finder unit 30 by using the light that passes through the lens unit 110, by calculating a proper distance between the lens unit 110 and the view finder unit 30 when the photographing apparatus is designed. However, this should not be construed as limiting, and the view finder unit 30 may also include an optical element (not shown) that focuses the light passing through the lens unit 110 on the view finder unit 30.

The view finder unit 30 may include a light blocking unit to prevent external light from affecting an image-capturing function performed by the image sensor 20. The light blocking unit may block out external light from entering the photographing apparatus via the view finder unit 30. The light blocking unit may be an optical film that is attached to one side of the view finder unit 30, for example. The optical film may perform a polarization function with respect to its proceeding direction. For example, the optical film may block out light from entering the photographing apparatus and may allow light that is emitted from the photographing apparatus to pass through the optical film.

For example, the light blocking unit may be implemented as a mechanical shutter that operates according to the control unit 40 or an electronic shutter using a liquid crystal device.

When the image-capturing function is performed using the image sensor 20, the light blocking unit of the view finder unit 30 may operate to prevent external light from being incident on the image sensor 20.

The light transmission adjustment unit 80 is disposed on the optical axis L, which corresponds to an optical center of the lens unit 110. The light transmission adjustment unit 80 is disposed on the optical axis L to be inclined with respect to the optical axis L. An inclination angle at which the light transmission adjustment unit 80 is inclined with respect to the optical axis L may not be as illustrated in FIG. 1 and may be varied according to a relationship between other elements of the photographing apparatus. For example, although FIG. 1 illustrates the light transmission adjustment unit 80 inclined with respect to the optical axis L at approximately 45 degrees, the inclination angle may be varied in a range between 0 and 45 degrees or between 90 and 180 degrees.

The light transmission adjustment unit 80 may be implemented using a device such as an electronic mirror, a switchable mirror, or a smart mirror. The light transmission adjustment unit 80 may use various types of switchable mirror, which controls light transmission and reflection using an electrical signal or other signals.

When a signal is applied to the light transmission adjustment unit 80, the light transmission adjustment unit 80 performs a function of adjusting light transmittance of the light that passes through the lens unit 110. As the signal is applied to the light transmission adjustment unit 80, light transmittance of the light transmission adjustment unit 80 is adjusted to any of a range of values between approximately 0% and 100% according to the signal. For example, the light transmittance may be adjusted to approximately 100% so that almost all light may be transmitted through the light transmission adjustment unit 80 (transmission mode), the light transmittance of the light transmission adjustment unit 80 may be adjusted to approximately 0% so that almost all light may be reflected by the light transmission adjustment unit 80 (total reflection mode), or the light transmittance of the light transmission adjustment unit 80 may be adjusted to within 0% and 100% so that some of input light may be transmitted through the light transmission adjustment unit 80 and a remaining portion of the light may be reflected by the light transmission adjustment unit 80 (partial reflection mode).

An electrochromism device uses a phenomenon by which color is varied reversibly according to a direction of an electric field when a voltage is applied to the electrochromism device. A material having light characteristics that are reversibly varied due to an electrical and chemical oxidation and reduction reaction is used in the electrochromism device. Electrical current that is applied to the electrochromism device causes a chemical change in its material, i.e., an oxidation and reduction reaction, and thus light transmittance and reflectivity is varied.

The material used in the electrochromism device may include titanium dioxide ($TiO_2$), indium tin oxide (ITO), which is mainly used as a transparent electrode material, various organic materials, such as an alloy of magnesium and calcium and an alloy of magnesium and titanium, an inorganic material, or a combination of an organic material and an inorganic material.

Liquid crystals of the liquid crystal device have both fluidity of a liquid and crystallization of a solid. When an electric field is applied to liquid crystals in an initial equilibrium state, according to dielectric anisotropy of the liquid crystals and the applied electric field, a dielectric torque is generated and thus liquid crystal molecules are variously rearranged. When the electric field is removed from the rearranged liquid crystal molecules, the liquid crystal molecules are returned to their original state due to an elastic restoration force. Light transmittance and reflectivity of the liquid crystal device may be adjusted using this principle of operation.

Light reflectivity may be improved by combining an alloy, such as silver (Ag) or gold (Au), with the liquid crystal device. The electronic mirror, which is formed of a combination of such a compound, may be manufactured in various forms, such as a thin layer form, a film form, a glass form, and the like.

A suspended particle device has a structure in which a conductive film is disposed between two transparent plates, for example, two pieces of glass. Suspended fine particles that absorb light are contained in the conductive film. That is, fine particles that absorb light are dispersed into a thin film. When electricity does not flow through the suspended particle device, the fine particles absorb light, and a glass window appears black. When electricity flows through the suspended particle device, the fine particles may be aligned on the film and thus light may pass through the suspended particle device. By adjusting an amount of electricity that flows manually or automatically, an amount of light that passes through the suspended particle device may be quickly and precisely adjusted.

A photochromic device is a device using a color pigment, for example, d-shine photochromic, that changes color when exposed to ultraviolet (UV) rays of sunlight or UV rays that are electrically generated.

A thermochromic device uses material of which color is varied according to temperature.

The light transmission adjustment unit 80, the image sensor 20, the shutter 21, and the view finder unit 30 may be electrically connected to the control unit 40 via wirings 41 and may be controlled by the control unit 40. A method of electrically connecting the control unit 40 and other elements of the photographing apparatus illustrated in FIG. 1 is not limited to a method using wirings 41 illustrated in FIG. 1. For example, the control unit 40 and other elements of the photographing apparatus of FIG. 1 may be connected to each other by using wireless communication or a flexible printed circuit board (FPCB), for example.

The control unit 40 may control the light transmission adjustment unit 80 to operate one of a total reflection mode in which the light passing through the lens unit 110 is reflected by the light transmission adjustment unit 80, a transmission mode in which the light passing through the lens unit 110 is transmitted through the light transmission adjustment unit 80, and a partial reflection mode in which only some of the light passing through the lens unit 110 is reflected by the light transmission adjustment unit 80.

When the control unit 40 adjusts the light transmittance of the light transmission adjustment unit 80 to approximately 100%, the view finder function of transferring the light that passes through the lens unit 110 to the view finder unit 30 and of displaying an image formed by the lens unit 110 on the view finder unit 30 may be performed.

When the control unit 40 adjusts the light transmittance of the light transmission adjustment unit 80 to approximately 0%, the image-capturing function in which the light that passes through the lens unit 110 is reflected by the light transmission adjustment unit 80 and an image formed by the lens unit 110 is captured by the image sensor 20, may be performed. When the view finder unit 30 is implemented as a transparent display and light is being reflected by the light transmission adjustment unit 80, the control unit 40 may control the view finder unit 30 to perform various functions, such as displaying a live view image that is obtained by the image sensor 20 on the view finder unit 30 in real-time, displaying an image captured by the image sensor 20 on the view finder unit 30, or displaying a menu for manipulation of the photographing apparatus.

When the view finder unit 30 is implemented as the transparent display, the view finder unit 30 may be controlled by the control unit 40 and may display an image. When light is reflected by the light transmission adjustment unit 80, the control unit 40 may apply a signal to the view finder unit 30 to display an image obtained by the image sensor 20 on the view finder unit 30. That is, before an image is captured, the control unit 40 may perform a live view function by displaying the image obtained by the image sensor 20 on the view finder unit 30 in real-time, and after the image is captured, the control unit 40 may display the image captured by the image sensor 20 on the view finder unit 30.

When the control unit 40 adjusts the light transmittance of the light transmission adjustment unit 80 to within 0% and 100%, the control unit 40 may perform a function of displaying a captured image in real-time in which image capturing using the image sensor 20 and image display using the view finder unit 30 are performed.

The function of displaying the captured image in real-time is used in performing a high-speed continuous shooting operation or capturing a video image. When a video image is captured, for example, about 20% of the light that passes through the lens unit 110 may be transferred to the view finder unit 30, and about 80% of the light that passes through the lens unit 110 may be transferred to the image sensor 20. Thus, even when the video image is captured using the image sensor 20, 20% of the light that passes through the lens unit 110 is used to display an image of a subject that is being captured on the view finder unit 30. In the related art, although a computational load of an image processing apparatus that is generated by executing an additional image processing algorithm that is required for providing an image of a subject to a user while a moving picture image is captured increases, a computational load of the image processing apparatus is greatly reduced according to the above-described operation example.

In addition, for example, even when the high-speed continuous shooting operation is performed, an image of a subject that is being captured may be provided to the view finder unit 30 by using 20% of the light that passes through the lens unit 110. In the related art, although an image processing operation needs to be performed to display a captured image on a display device while the high-speed continuous shooting operation is performed, the photographing apparatus according to the current embodiment does not need to perform an additional image processing algorithm. In addition, the image of the subject to be captured may be provided to the user via the view finder unit 30 continuously and naturally while the high-speed continuous shooting operation is performed.

However, the above-described operation example should not be construed as limiting. For example, when the high-speed continuous shooting operation is performed and a moving picture image is captured, the control unit 40 may adjust the light transmittance of the light transmission adjustment unit 80 to approximately 0% so that light is not transferred to the view finder unit 30. For example, when the moving picture image is captured, the control unit 40 may adjust the light transmittance of the light transmission adjustment unit 80 to approximately 0% so that all the light that passes through the lens unit 110 is reflected toward the image sensor 20 and a sufficient amount of light for capturing the moving picture image may be obtained. In this case, when the moving picture image is captured, the EVF function in which the view finder unit 30 displays an image in response to a signal applied by the control unit 40 may be performed.

The image sensor 20 may further include a focus detection function for auto-focusing (AF) in addition to the image-capturing function of obtaining image data that represents an image by converting image light into an electrical signal. A hybrid auto-focusing (AF) technology refers to the image sensor 20 having the focus detection function. In order to perform the hybrid AF technology, the image sensor 20 may include an AF sensor for detecting a phase difference of an image formed by the light that passes through the lens unit 110. The AF sensor may be disposed in a space between pixels for obtaining an image by using the image sensor 20, for example.

The photographing apparatus having the above structure may also use a contrast AF method whereby a focusing function is performed by detecting a variation in contrast from an image obtained by using the image sensor 20.

Figure 2:
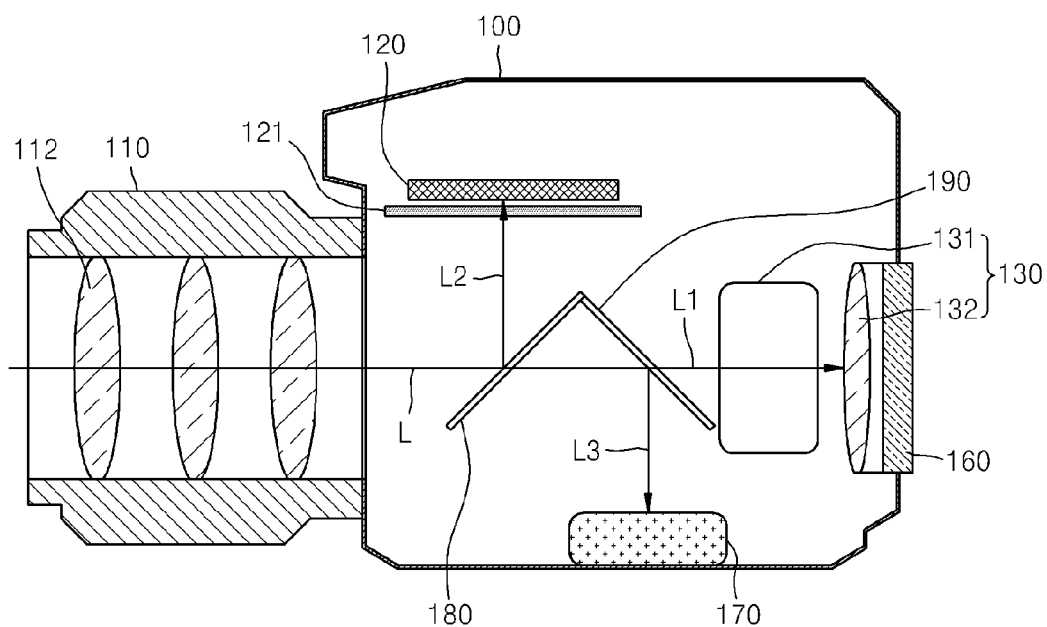
FIG. 2 is a schematic view of elements of a photographing apparatus, according to another embodiment.

FIG. 2 is a schematic view of elements of a photographing apparatus, according to another embodiment.

Referring to FIG. 2, the photographing apparatus according to the current embodiment includes a lens unit 110, a light transmission adjustment unit 180 that is disposed on an optical axis L on which light that passes through the lens unit 110 proceeds and to be inclined with respect to the optical axis L, an image sensor 120 that is disposed on a reflected light path L2 on which light that is reflected by the light transmission adjustment unit 180 proceeds, and a view finder unit 130 that is disposed on a transmitted light path L1 on which light that passes through the light transmission adjustment unit 180 proceeds and displays an image formed by the light that passes through the lens unit 110.

In the current embodiment, the image sensor 120 is an example of a photographing unit that receives light and generates an electrical signal. The image sensor 120 is disposed on the reflected light path L2 on which the light that is reflected by the light transmission adjustment unit 180 proceeds. A shutter 121 may be disposed in front of the image sensor 120 on the reflected light path L2.

The view finder unit 130 performs a function of providing an image of a subject to be captured to a user of the photographing apparatus so as to perform framing for capturing an image and a focusing operation. In the current embodiment, the view finder unit 130 is disposed on a straight line extending from the transmitted light path L1 on which the light that passes through the lens unit 110 proceeds.

The view finder unit 130 includes an optical element 131 that forms an image by forming an image of the light that passes through the light transmission adjustment unit 180, and an eyepiece 132 that displays the image of light formed by the optical element 131 on an outside of a main body 100.

An image information display unit 160 may be disposed close to the view finder unit 130 on the main body 100 of the photographing apparatus. The image information display unit 160 performs a function of displaying image information for capturing an image or displaying information regarding a captured image.

The light transmission adjustment unit 180 is disposed on the optical axis L, which corresponds to an optical center of the lens unit 110. The light transmission adjustment unit 180 is disposed on the optical axis L to be inclined with respect to the optical axis L. An inclination angle at which the light transmission adjustment unit 180 is inclined with respect to the optical axis L may not be as illustrated in FIG. 2 and may be varied according to a relationship between other elements of the photographing apparatus.

When a signal is applied to the light transmission adjustment unit 180, the light transmission adjustment unit 180 performs a function of adjusting light transmittance of the light that passes through the lens unit 110. As the signal is applied to the light transmission adjustment unit 180, light transmittance of the light transmission adjustment unit 180 may be adjusted to approximately 100% so that almost all light may be transmitted through the light transmission adjustment unit 180, the light transmittance of the light transmission adjustment unit 180 may be adjusted to approximately 0% so that almost all light may be reflected by the light transmission adjustment unit 180, or the light transmittance of the light transmission adjustment unit 180 may be adjusted to within 0% and 100% so that some of the light may be transmitted through the light transmission adjustment unit 180 and a remaining portion of the light may be reflected by the light transmission adjustment unit 180.

The light transmission adjustment unit 180 may be implemented using a device such as an electronic mirror, a switchable mirror, or a smart mirror. The light transmission adjustment unit 180 may use the switchable mirror, which operates using a method other than a method of controlling light transmission and reflection using an electrical signal.

For example, the light transmission adjustment unit 180 may include at least one device that is selected from the group consisting of an electrochromic device, a liquid crystal device, a suspended particle device, a photochromic device, and a thermochromic device. These devices are examples of devices that adjust light transmittance and reflectivity based on electricity, light, or a temperature change.

A control unit 140 (see FIG. 3) that is electrically connected to the light transmission adjustment unit 180 and the image sensor 120 may be disposed on the main body 100 of the photographing apparatus. Although the control unit 140 is not shown in FIG. 2 for convenience, the control unit 140 having a shape that will be described below in FIG. 3 may be installed at the main body 100 of the photographing apparatus.

Figure 3:
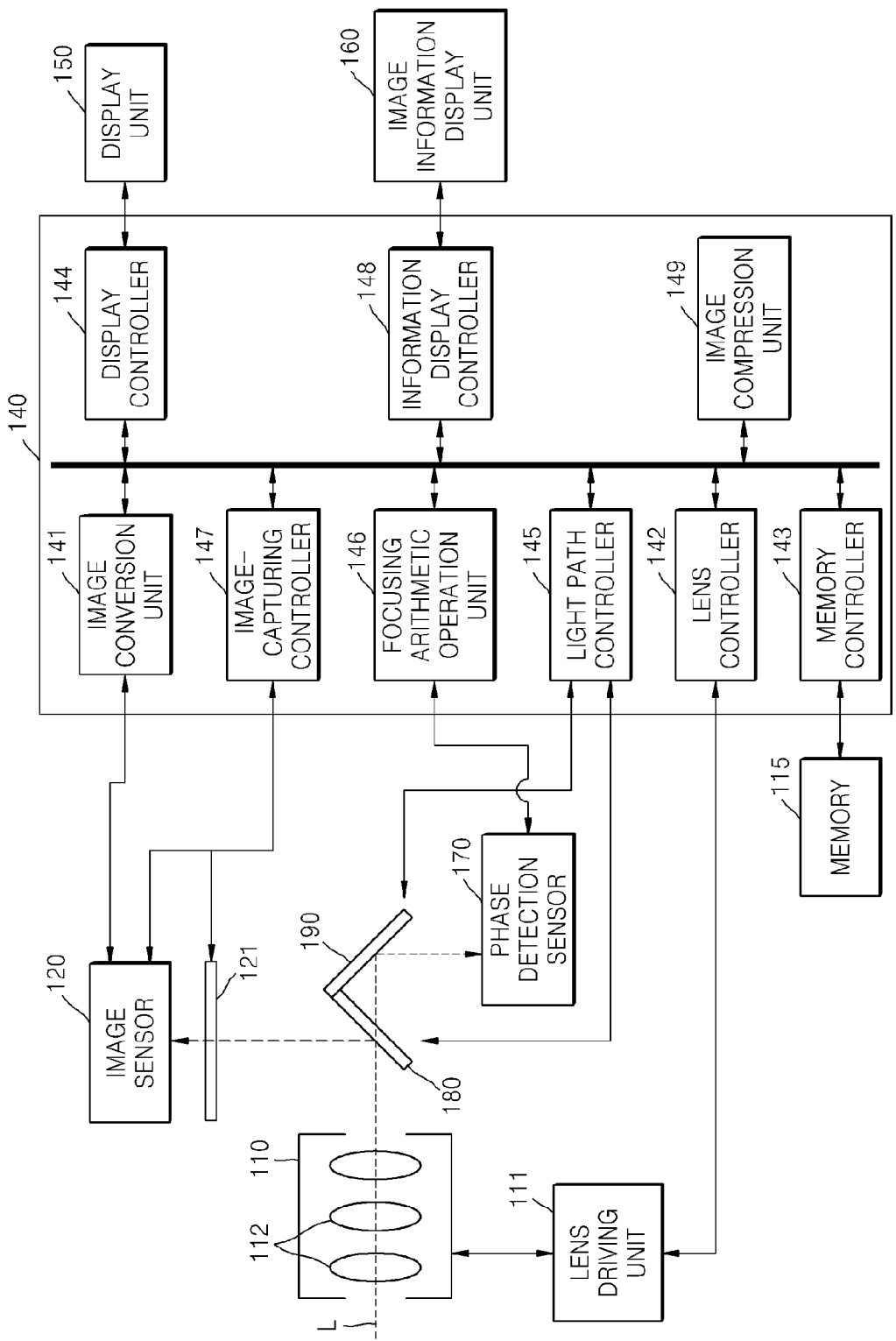
FIG. 3 is a schematic block diagram illustrating a relationship between elements of the photographing apparatus illustrated in FIG. 2, according to an embodiment.

FIG. 3 is a schematic block diagram illustrating a relationship between elements of the photographing apparatus illustrated in FIG. 2, according to an embodiment.

The image sensor 120 captures an image of a subject and converts the image of the subject into an electrical signal to generate an image data. The electrical signal that is generated by the image sensor 120 is converted into image data by an image conversion unit 141. Alternatively, the image sensor 120 may convert the electrical signal into image data. An image-capturing controller 147 of the control unit 140 controls the image sensor 120, the shutter 121, the light transmission adjustment unit 180, and a reflection unit 190, thereby performing a photographing operation.

The lens unit 110 includes a plurality of lenses 112 and is disposed in front of the image sensor 120. The lens unit 110 performs a function of forming an image of external image light on an image-capturing side of the image sensor 120.

The plurality of lenses 112 may be disposed with variable intervals therebetween. When the intervals between the lenses 112 are varied, a zooming rate or focus may be adjusted. The lenses 112 are disposed along the optical axis L. Here, the optical axis L refers to a virtual straight line that connects optical centers of the lenses 112.

The lenses 112 are driven by a lens driving unit 111 having a driving unit, such as a zooming motor (not shown), so that positions of the lenses 112 may be varied. The lenses 112 may include a zooming lens that enlarges or reduces a size of a subject, a focusing lens that adjusts a focus of the subject, and the like.

The lens driving unit 111 operates in response to a control signal applied by a lens controller 142 of the control unit 140 and controls the positions of the lenses 112 so that the lenses 112 have one among a plurality of enlargement magnifications.

The image sensor 120 includes a photoelectric transformation element, such as a CCD or a CMOS, and converts image light that is incident on the image sensor 120 after passing through the lens unit 110 into an electrical signal. The image sensor 120 is driven by a control signal applied by the image-capturing controller 147.

The image conversion unit 141 may convert an electrical signal of the image sensor 120 into image data to perform image processing on the image data or to store the image data in a storage medium, such as a memory 115. For example, the image conversion unit 141 may convert the electrical signal of the image sensor 120 into RGB data and then may convert the RGB data into raw data having the same form as that of a YUV signal including a brightness (Y) signal and a color difference (UV) signal.

In addition, an operation of converting an electrical signal of the image sensor 120 by using the image conversion unit 141 includes reducing driving noise of the image sensor 120 included in the electrical signal by using a correlation double sampling (CDS) circuit, for example, adjusting a gain of a signal after the driving noise of the image sensor 120 is reduced by using an automatic gain control (AGC) circuit, converting an analog signal into a digital signal by using an analog to digital (A/D) converter, and performing signal processing, such as pixel defect correction, gain correction, white balance correction, and gamma correction, on the digital signal. The above-described CDS circuit, the AGC circuit, or the A/D converter may also be formed as an additional circuit.

The control unit 140 is electrically connected to the image sensor 120, the shutter 121, the lens driving unit 111, the image information display unit 160, and the memory 115 and performs a function of exchanging a control signal with the image sensor 120, the shutter 121, and the lens driving unit 111, the image information display unit 160, and the memory 115 so as to control operations of the elements, or a data processing function.

The control unit 140 includes the image conversion unit 141, the lens controller 142, a memory controller 143, a display controller 144, a light path controller 145, a focusing arithmetic operation unit 146, the image-capturing controller 147, an information display controller 148, and an image compression unit 149.

The control unit 140 may be implemented as a micro-chip or a circuit board including a micro-chip. Elements of the control unit 140 may be implemented by software or circuits disposed in the control unit 140.

The memory controller 143 controls recording of data on the memory 115 and reading of recorded data or setting information from the memory 115.

The memory 115 may be a volatile embedded memory, for example, a semiconductor memory device, such as a synchronous dynamic random access memory (DRAM or SDRAM) or the like. The memory 115 may perform a buffer memory function of temporarily storing image data that is generated by the image conversion unit 141 and a work memory function that is used for performing data processing.

Also, the memory 115 may be a non-volatile external memory, for example, a flash memory, such as a memory stick or a SD/MMC, a storage device, such as a hard disk drive (HDD), or an optical storage device, such as a digital versatile disc (DVD) or compact disc (CD). In this case, image data that is compressed and converted by the image compression unit 149 into a format of a file, such as a JPEG file, a GIF file, a PCX file, or the like, may be stored in the memory 115.

The photographing apparatus may include a display unit 150 that displays an image of image data. The display unit 150 may be implemented as a touch screen that generates a signal at a position where it is sensed that a surface of the photographing apparatus is touched, by using a display device, such as an LCD device or an OLED.

The information display controller 148 controls a function of displaying various information regarding the photographing apparatus on the image information display unit 160. Referring to FIG. 2, the image information display unit 160 is exposed outside and behind the main body 100 and may be installed to overlap the view finder unit 130 or adjacent to the view finder unit 130.

Referring to FIG. 2, the reflection unit 190 may be disposed between the view finder unit 130 and the light transmission adjustment unit 180. The reflection unit 190 is disposed on the transmitted light path L1 to be inclined with respect to the transmitted light path L1. The reflection unit 190 reflects some of the light that passes through the light transmission adjustment unit 180 and allows a remaining portion of the light to pass through the view finder unit 130.

The reflection unit 190 may be implemented as an electronic mirror of which light transmittance is adjusted when a signal is applied to the electronic mirror, like in the light transmission adjustment unit 180. The current embodiment is not limited to the configuration of the reflection unit 190. Thus, the reflection unit 190 may be implemented as a half-mirror of which transmittance is adjusted to allow some of input light to be transmitted through the half-mirror and a remaining portion of the light to be reflected by the half-mirror.

The reflection unit 190 may include one selected from the group consisting of an electrochromic device, a liquid crystal device, a suspended particle device, a photochromic device, and a thermochromic device.

The photographing apparatus may include a phase detection sensor 170 that is disposed on a transmitted light path L3 on which light that is reflected by the reflection unit 190 proceeds. In the current embodiment, the phase detection sensor 170 is an example of a phase detection unit.

The phase detection sensor 170 may include a plurality of image sensors, for example. The phase detection sensor 170 detects a difference in phases between a plurality of images that are captured from light of subjects incident on the photographing apparatus at different angles. An AF function may be performed using the phase detection sensor 170.

The light path controller 145 controls the light transmission adjustment unit 180 and the reflection unit 190. The light path controller 145 may adjust the light transmittance of the light transmission adjustment unit 180 and light transmittance of the reflection unit 190.

When the light transmission adjustment unit 180, which is controlled by the light path controller 145, operates in the transmission mode, in which light is transmitted through the light transmission adjustment unit 180, the view finder function of displaying an image of a subject to be captured on the view finder unit 130 may be performed. While the view finder function is performed, the light that is reflected by the reflection unit 190 is incident on the phase detection sensor 170. Thus, focusing of the subject may be quickly performed before image capturing is performed.

A photographing apparatus, such as a digital single-lens reflex camera (DLSR), generally includes an optical view finder but requires complicated optical mechanisms including a pentaprism and thus has a large number of components and a complicated structure. In addition, the photographing apparatus includes an essential element, such as a mirror operating assembly that operates automatically. In the mirror operating assembly that is used in the DSLR, a mirror is folded upwards when image capturing is performed, and the mirror goes down when the optical view finder is to be used. The photographing apparatus including the mirror operating assembly has a large number of elements and thus has a complicated design and large volume.

In the photographing apparatus according to the current embodiment, the position of the light transmission adjustment unit 180 is maintained fixed, and as the light transmittance of the light transmission adjustment unit 180 is adjusted, both the view finder function of the view finder unit 130 and the image-capturing function using the image sensor 120 may be performed. According to the photographing apparatus having the above structure, a complicated mechanism including an additional mirror operating assembly or a pentaprism is not required and thus a compact design of the photographing apparatus may be realized.

Figure 4:
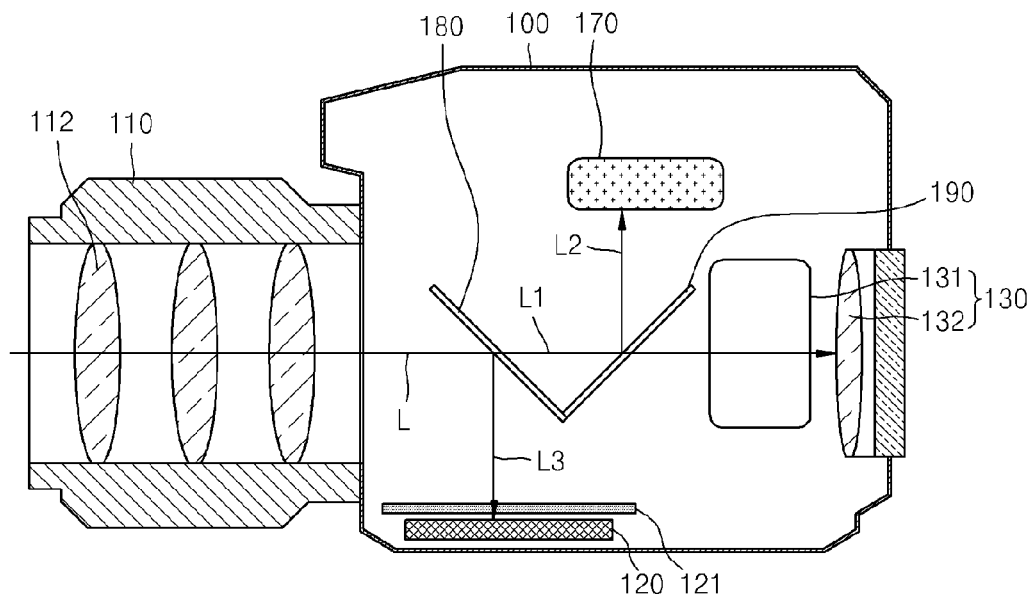
FIG. 4 is a schematic view of elements of a photographing apparatus, according to another embodiment.

FIG. 4 is a schematic view of elements of a photographing apparatus, according to another embodiment.

The photographing apparatus illustrated in FIG. 4 has a structure similar to that of the photographing apparatus illustrated in FIG. 2. Thus, like reference numerals refer to like elements.

In the embodiment of FIG. 4, positions at which an image sensor 120 and a phase detection sensor 170 are to be installed are changed with respect to those of the embodiment of FIG. 2. That is, the image sensor 120 is disposed in a lower portion of a main body 100 of the photographing apparatus, and the phase detection sensor 170 is disposed in an upper portion of the main body 100 of the photographing apparatus. In order to constitute the arrangement, a light transmission adjustment unit 180 is disposed on an optical axis L to be inclined with respect to the optical axis L such that a front side of the light transmission adjustment unit 180 is directed downwards, and a reflection unit 190 is disposed on the optical axis L to be inclined with respect to the optical axis L such that a front side of the reflection unit 190 is directed upwards.

In the embodiments illustrated in FIGS. 2 and 4, a direction in which the light transmission adjustment unit 180 is inclined with respect to the optical axis L, and a direction in which the reflection unit 190 is inclined with respect to the optical axis L are opposite to each other. Thus, light that is reflected by the light transmission adjustment unit 180 and light that is reflected by the reflection unit 190 may proceed in opposite directions with respect to the optical axis L.

Figure 5:
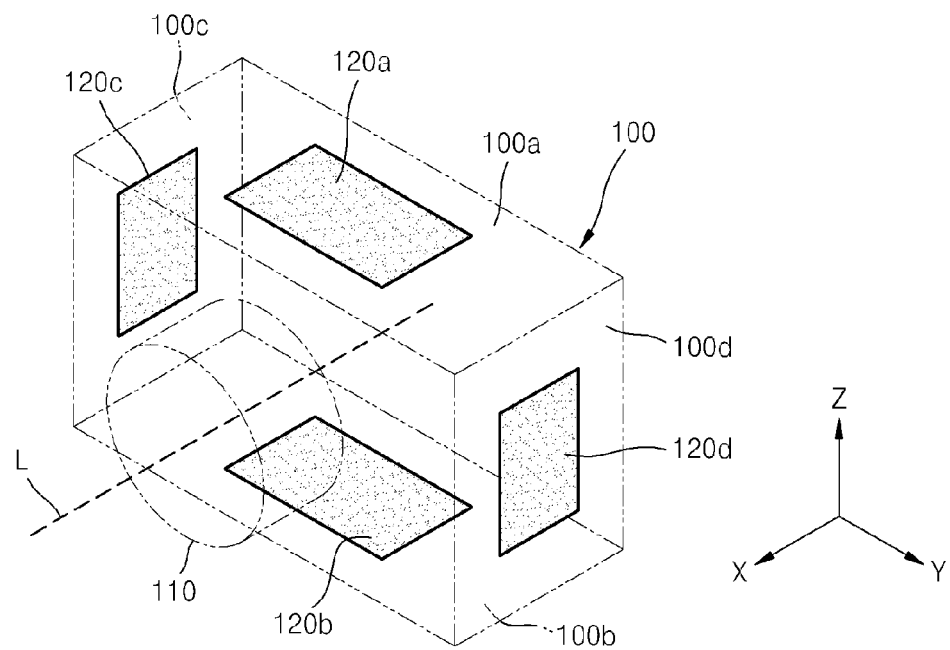
FIG. 5 is a schematic view of elements of a photographing apparatus, according to another embodiment.

FIG. 5 is a schematic view of elements of a photographing apparatus, according to another embodiment.

In the photographing apparatus illustrated in FIG. 5, a position of an image sensor 120 is different from the positions of the image sensors 120 illustrated in FIGS. 2 and 4. A main body 100 of the photographing apparatus serves as a case for surrounding other elements and includes four sides 120a, 120b, 120c, and 120d to surround the other elements, as illustrated in FIG. 5.

A light transmission adjustment unit 180 (not shown) may be disposed on an optical axis L of a lens unit 110 to be inclined with respect to the optical axis L so as to reflect light on one of the four sides 120a, 120b, 120c, and 120d of the main body 100, and the image sensor 120 may be disposed on a side on which the light that is reflected by the light transmission adjustment unit 180 is incident, among the four sides 120a, 120b, 120c, and 120d of the main body 100.

Figure 6:
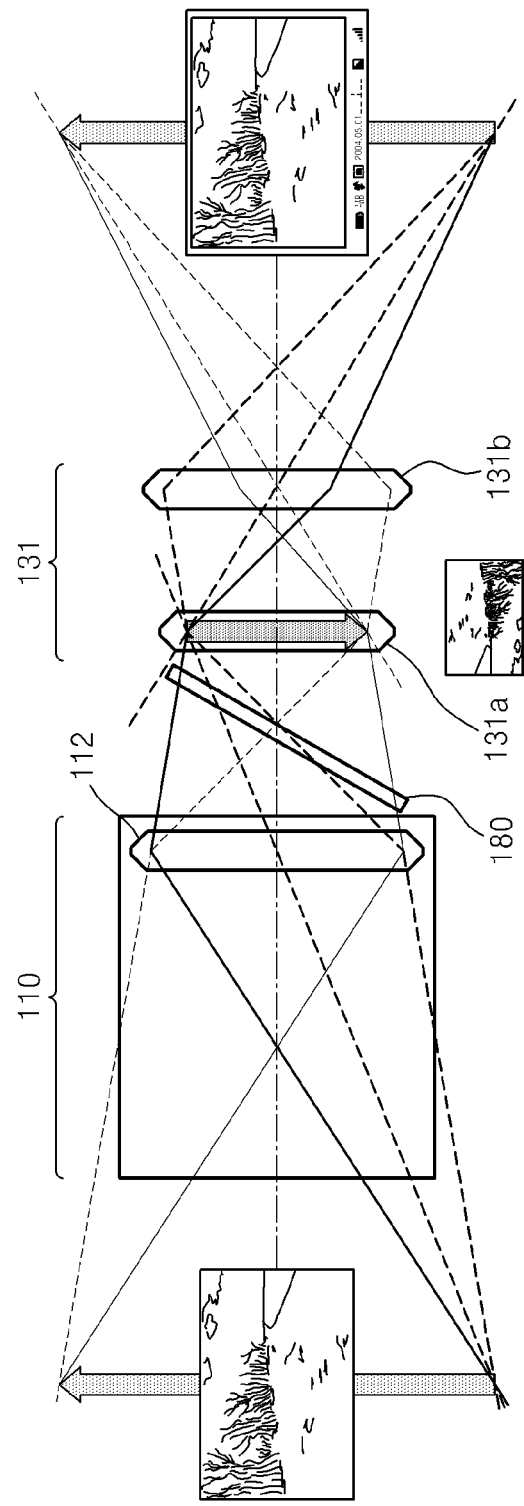
FIG. 6 is a schematic view of some of the elements of the photographing apparatuses illustrated in FIGS. 2 and 4, according to an embodiment.

FIG. 6 is a schematic view of some of the elements of the photographing apparatuses illustrated in FIGS. 2 and 4, according to an embodiment.

FIG. 6 illustrates a detailed structure of the optical element 131 having a block shape, as illustrated in FIGS. 2 and 4. The optical element 131 includes an objective lens 131a that forms an image by changing a path of light that passes through the light transmission adjustment unit 180, and a relay lens 131b that adjusts a magnification of the image formed by the objective lens 131a.

Light of a subject that is disposed in a vertical direction, as illustrated in FIG. 6, is incident on the objective lens 131a when the light passes through the lens 112 of the lens unit 110 and the light transmission adjustment unit 180 and an image thereof is reversed in a horizontal direction, but then as the image of the objective lens 131a passes through the relay lens 131b, the image is converted into an image that is re-reversed in the horizontal direction. As a result, an image that passes through the optical element 131 may be displayed by the view finder unit 130 in an original subject direction.

Figure 7:
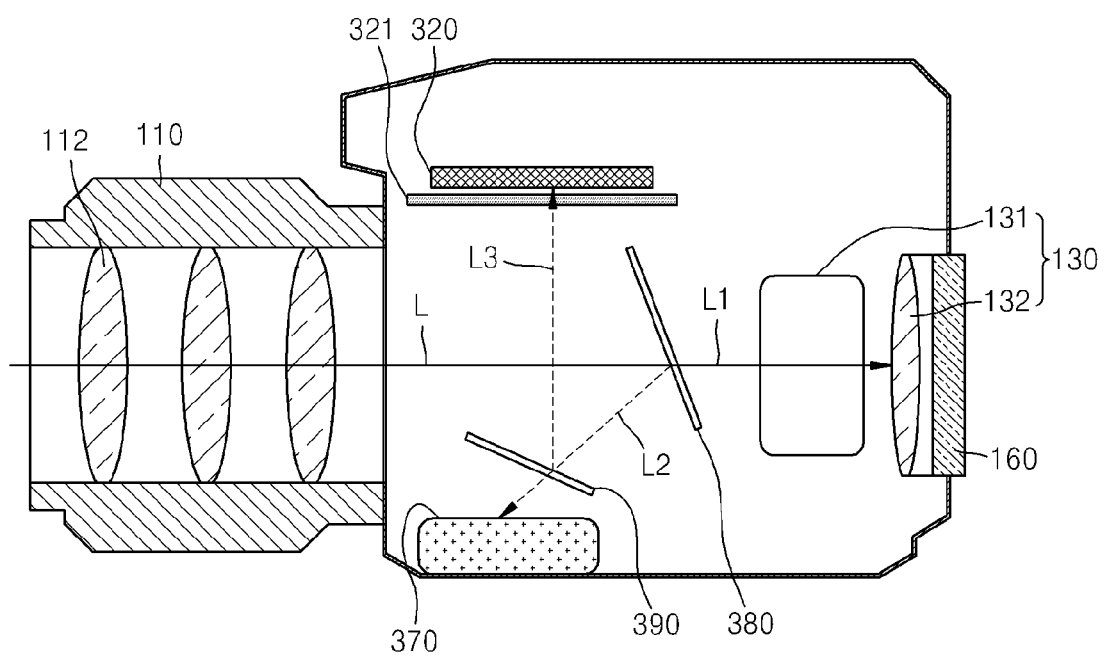
FIG. 7 is a schematic view of elements of a photographing apparatus, according to another embodiment.

FIG. 7 is a schematic view of elements of a photographing apparatus, according to another embodiment.

The photographing apparatus illustrated in FIG. 7 includes a lens unit 110 including lenses 112, a light transmission adjustment unit 380 that is disposed on an optical axis L on which light that passes through the lens unit 110 proceeds and to be inclined with respect to the optical axis L, a phase detection sensor 370 that is disposed on a reflected light path L2 on which light that is reflected by the light transmission adjustment unit 380 proceeds, and a view finder unit 130 that is disposed on a transmitted light path L1 on which light that passes through the light transmission adjustment unit 380 proceeds and that displays an image formed by the light that passes through the lens unit 110.

The phase detection sensor 370 performs the same function as the phase detection sensor 170 illustrated in FIGS. 2 and 4.

A reflection unit 390 is disposed between the light transmission adjustment unit 380 and the phase detection sensor 370 on the reflected light path L2 on which the light that is reflected by the light transmission adjustment unit 380 proceeds, and an image sensor 320 is disposed on the reflected light path L3 on which light that is reflected by the reflection unit 390 proceeds. The image sensor 320 generates image data that represents an image by receiving light and corresponds to a photographing unit.

The reflection unit 390 may be implemented as a half-mirror of which transmittance is adjusted to allow some of input light to be transmitted through the half-mirror and a remaining portion of the light to be reflected by the half-mirror, or an electronic mirror of which light transmittance is adjusted when a signal is applied to the electronic mirror.

A shutter 321 may be disposed in front of the image sensor 320 on the reflected light path L3 of the reflection unit 390. The shutter 321 operates when a signal is applied to the shutter 321 and blocks out light that is incident on the image sensor 320. The shutter 321 is not an essential element, and thus the shutter 321 may be omitted, and a function of a shutter may be performed using the light transmission adjustment unit 380.

The current embodiment is not limited to the configuration of FIG. 7. By modifying the arrangement of FIG. 7, the phase detection sensor 370 may be disposed on the reflected light path L3 of the reflection unit 390, and the image sensor 320 may be disposed on a path of light that is transmitted through the reflection unit 390.

Figure 8:
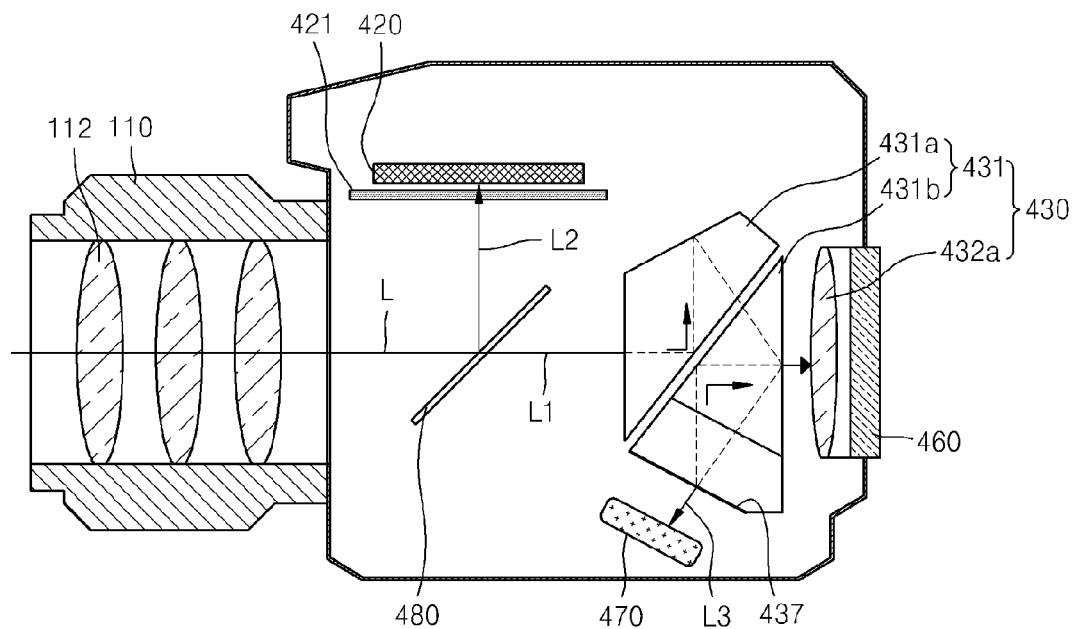
FIG. 8 is a schematic view of elements of a photographing apparatus, according to another embodiment.

FIG. 8 is a schematic view of elements of a photographing apparatus, according to another embodiment.

The photographing apparatus illustrated in FIG. 8 includes a lens unit 110 including lenses 112, a light transmission adjustment unit 480 that is disposed on an optical axis L on which light that passes through the lens unit 110 proceeds and to be inclined with respect to the optical axis L, an image sensor 420 that is disposed on a reflected light path L2 on which light that is reflected by the light transmission adjustment unit 480 proceeds, and a view finder unit 430 that is disposed on the transmitted light path L1 on which light that passes through the light transmission adjustment unit 480 proceeds and that displays an image formed by light that passes through the lens unit 110.

In the embodiment of FIG. 8, the image sensor 420 corresponds to a photographing unit. A shutter 421 may be disposed in front of the image sensor 420 on the reflected light path L2 of the light transmission adjustment unit 480. The shutter 421 blocks out light that is incident on the image sensor 420 when a signal is applied to the shutter 421. The shutter 421 is not an essential element, and the shutter 421 may be omitted, and a function of a shutter may be performed using the light transmission adjustment unit 480.

The view finder unit 430 is disposed on a straight line extending from the transmitted light path L1 on which the light that passes through the light transmission adjustment unit 480 proceeds. The view finder unit 430 includes a prism unit 431 that transfers some of the light to the light transmission adjustment unit 480 and transfers a remaining portion of the light at an angle different from an angle of a proceeding path of light that is incident on the light transmission adjustment unit 480. The prism unit 431 includes a first prism 431a and a second prism 431b.

A phase detection sensor 470 is disposed on a transmitted light path L3 on which light that passes through the prism unit 431 proceeds. The phase detection sensor 470 corresponds to a phase detection unit.

The current embodiment of FIG. 8 is not limited by the number of prisms of the prism unit 431 or the shape of the first and second prisms 431a and 431b illustrated in FIG. 8. The prism unit 431 may be modified to include a different number of prisms with different shapes.

The second prism 431b includes a reflective surface 437 relatively near to the phase detection sensor 470. The second prism 431b allows some of input light to be transmitted through the second prism 431b toward the phase detection sensor 470 and a remaining portion of the light to be reflected by the second prism 431b. The reflective surface 437 of the second prism 431b may be implemented as a half-mirror of which transmittance is uniform, or an electronic mirror of which transmittance is adjusted when a signal is applied to the electronic mirror.

Light that is reflected from the reflective surface 437 of the second prism 431b is incident on an eyepiece 432a, and the eyepiece 432a may form an image for the view finder function and may display the image on an outside of the photographing apparatus.

The current embodiment is not limited to the configuration of FIG. 8. By modifying the arrangement of FIG. 8, the image sensor 420 may be disposed on the transmitted light path L3 of the prism unit 431, and the phase detection sensor 470 may be disposed on the reflected light path L2.

Figure 9:
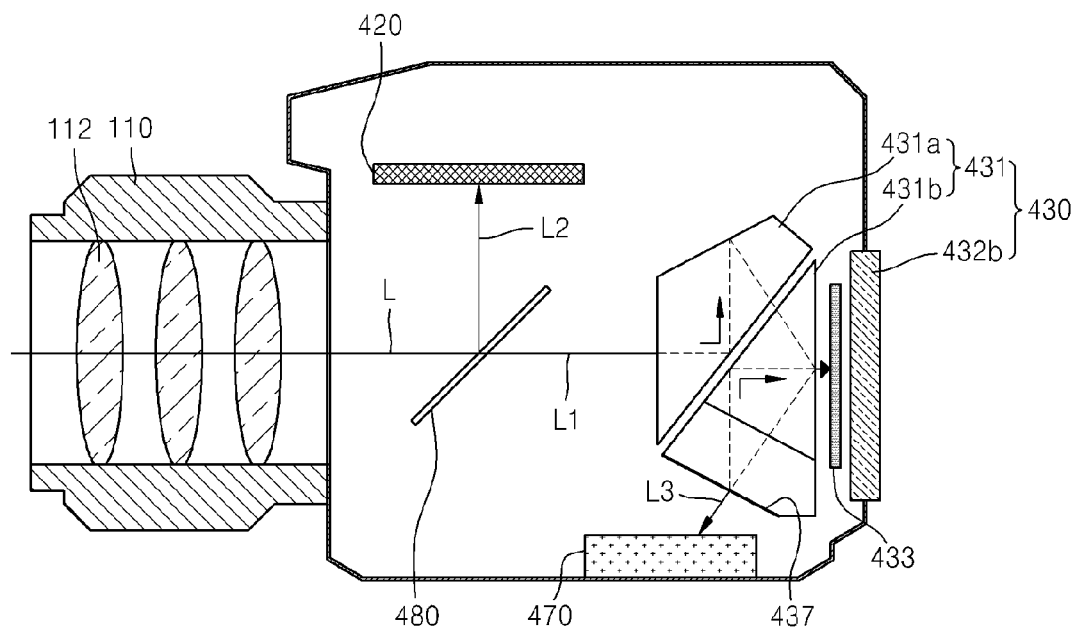
FIG. 9 is a schematic view of elements of a photographing apparatus, according to another embodiment.

FIG. 9 is a schematic view of elements of a photographing apparatus, according to another embodiment.

The photographing apparatus illustrated in FIG. 9 has a structure similar to that of the photographing apparatus of FIG. 8, and a configuration of a view finder unit 430 is modified.

In the embodiment of FIG. 8, the eyepiece 432a is used in the view finder unit 430. However, in the embodiment of FIG. 9, the view finder unit 430 includes a prism unit 431 and a transparent display 432b. The transparent display 432b performs both a function of allowing light to be transmitted therethrough and a function of displaying an image. A view finder shutter 433 is disposed in front of the transparent display 432b and blocks out light to be transferred to the transparent display 432b when a signal is applied to the transparent display 432b.

In addition, in the photographing apparatus illustrated in FIG. 9, a shutter is not disposed in front of an image sensor 420 but a function of a shutter is performed using a light transmission adjustment unit 480. That is, in order to perform an exposure operation of the image sensor 420, the light transmission adjustment unit 480 may reflect light toward the image sensor 420 and may allow all the light to be transmitted through the prism unit 431 after the exposure operation of the image sensor 420 is terminated.

When transmitted light is blocked out by the view finder shutter 433, the transparent display 432b may perform the function of the display unit 150 illustrated in FIG. 3. In addition, when the view finder shutter 433 is opened and light that passes through a lens unit 110 is transferred to the view finder shutter 433, the transparent display 432b may perform the view finder function of displaying an image that is transferred from the prism unit 431 and the function of the image information display unit 160 of FIG. 2, which displays image information.

Figure 10:
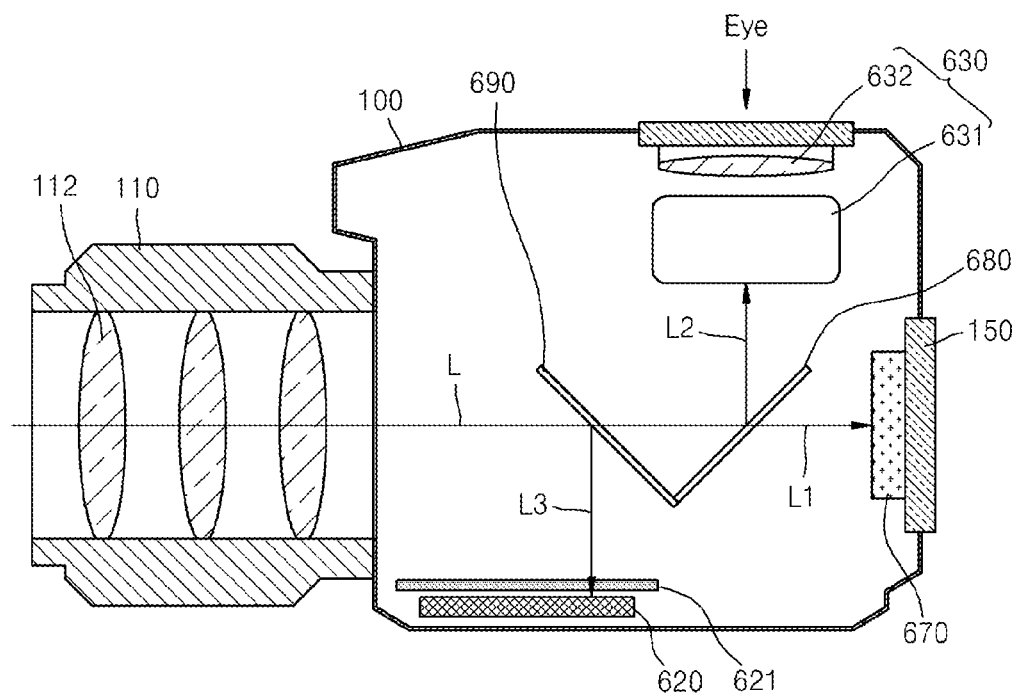
FIG. 10 is a schematic view of elements of a photographing apparatus, according to another embodiment.

FIG. 10 is a schematic view of elements of a photographing apparatus, according to another embodiment.

The photographing apparatus illustrated in FIG. 10 includes a lens unit 110 including lenses 112, a light transmission adjustment unit 680 that is disposed on an optical axis L on which light that passes through the lens unit 110 proceeds to be inclined with respect to the optical axis L, a view finder unit 630 that is disposed on a reflected light path L2 on which light that is reflected from the light transmission adjustment unit 680 proceeds and that displays an image formed by the light that passes through the lens unit 110, and a phase detection sensor 670 that is disposed on a transmitted light path L1 on which light that passes through the light transmission adjustment unit 680 proceeds and that detects a phase difference between images by receiving light.

Figure 12:
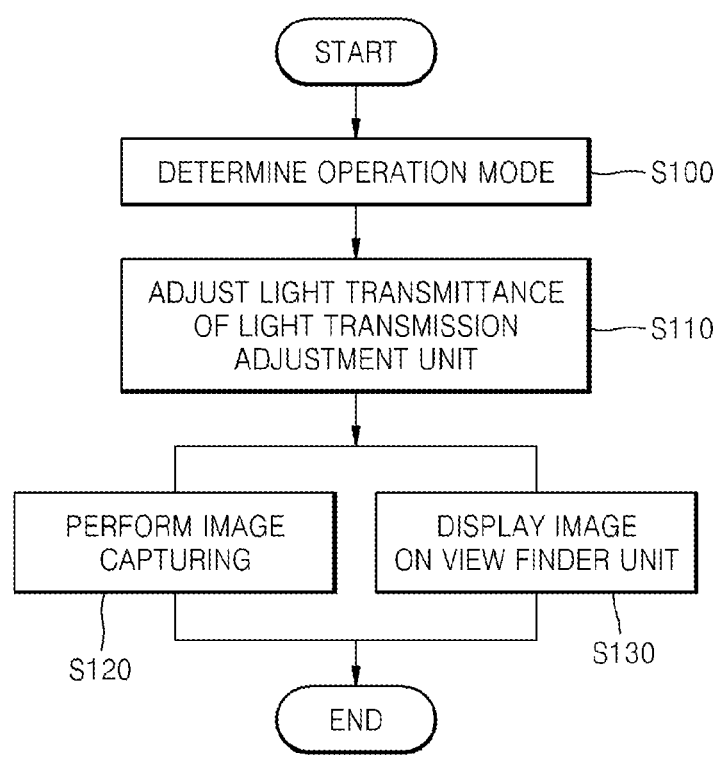
FIG. 12 is flowchart schematically illustrating operations of a photographing method, according to an embodiment.

In the embodiment of FIG. 12, the phase detection sensor 670 corresponds to a phase detection unit.

The view finder unit 630 includes an optical element 631 that is disposed on the reflected light path L2 on which the light that is reflected from the light transmission adjustment unit 680 proceeds, and an eyepiece 632 that is disposed at a position at which light is focused on by the optical element 631 and that displays an image of light formed by the optical element 631. Since the view finder unit 630 is exposed upwards from an upper portion of a main body 100 of the photographing apparatus, a user may capture an image conveniently when viewing the photographing apparatus from above.

A reflection unit 690 may be disposed between the light transmission adjustment unit 680 and the lens unit 110 to be inclined with respect to the optical axis L. The reflection unit 690 allows some of the light that passes through the lens unit 110 to be transmitted through the light transmission adjustment unit 680 and reflects a remaining portion of the light.

The reflection unit 690 may be implemented as a half-mirror of which light transmittance is uniform, or an electronic mirror of which light transmittance is adjusted when a signal is applied to the electronic mirror.

A shutter 621 and an image sensor 620 are disposed on a reflected light path L3 on which light that is reflected from the reflection unit 690 proceeds. The shutter 621 operates when a signal is applied to the shutter 621 and blocks out light that is incident on the image sensor 620. In the current embodiment, the image sensor 620 corresponds to a photographing unit.

The current embodiment is not required to include the shutter 621, and the shutter 621 may be omitted. When the shutter 621 is removed from the photographing apparatus, the light transmission adjustment unit 680 may replace the shutter 621.

The current embodiment is not limited to the configuration of FIG. 102. By modifying the arrangement of FIG. 10, the phase detection unit 670 may be disposed on the reflected light path L3 of the reflection unit 690, and the image sensor 620 may be disposed on the transmitted light path L1 of the light transmission adjustment unit 680.

Figure 11:
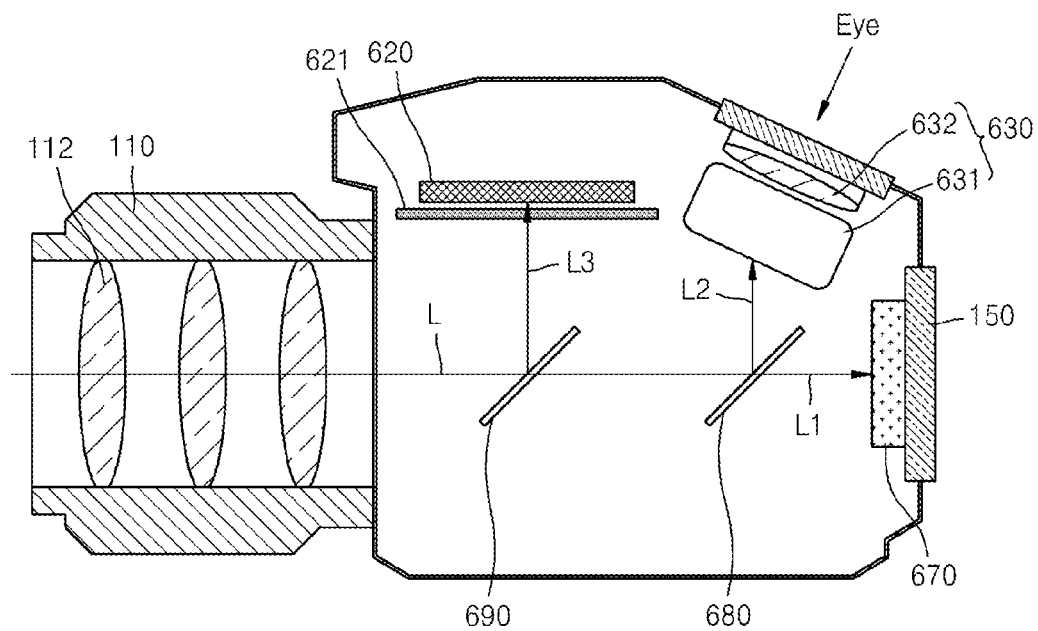
FIG. 11 is a schematic view of some elements of a photographing apparatus, according to another embodiment.

FIG. 11 is a schematic view of some of elements of a photographing apparatus, according to another embodiment.

The photographing apparatus illustrated in FIG. 11 has a structure similar to that of the photographing apparatus illustrated in FIG. 10, and a position and a direction at which a view finder unit 630 is to be disposed, a position at which an image sensor 620 is to be disposed, and a position and a direction at which a reflection unit 690 is to be disposed, are modified.

In the embodiment of FIG. 10, a direction in which the light transmission adjustment unit 680 is inclined with respect to the optical axis L, and a direction in which the reflection unit 690 is inclined with respect to the optical axis L are opposite to each other. However, in the embodiment of FIG. 11, the light transmission adjustment unit 680 and the reflection unit 690 are disposed on the optical axis L to be inclined with respect to the optical axis L in the same direction so as to reflect light in the same direction with respect to the optical axis L.

In addition, in the embodiment of FIG. 11, a direction in which the view finder unit 630 is to be installed is modified to be further inclined towards a rear side of a main body 100 of the photographing apparatus compared to the photographing apparatus illustrated in FIG. 10. In this way, a position at which an image sensor 620, a phase detection unit 670, or the view finder unit 630 is to be disposed, may be modified in various ways.

The current embodiment is not limited to the configuration of FIG. 11. By modifying the arrangement of FIG. 11, the phase detection unit 670 may be disposed on a reflected light path L3 of the reflection unit 690, and the image sensor 620 may be disposed on a transmitted light path L1 of the light transmission adjustment unit 680.

FIG. 12 is flowchart schematically illustrating operations of a photographing method, according to an embodiment.

The photographing method illustrated in FIG. 12 includes determining an operation mode (S100), adjusting light transmittance of a light transmission adjustment unit (S110), performing image capturing based on the determined operation mode (S120), and displaying an image on a view finder unit (S130).

The determining of the operation mode (S100) includes determining whether to perform image capturing by using the photographing apparatus or to display a view finder image on the view finder unit.

When the operation mode is determined, the light transmittance of the light transmission adjustment unit may be adjusted based on the determined operation mode. That is, the light transmittance of the light transmission adjustment unit may be adjusted such that light may be transmitted through the light transmission adjustment unit (transmission mode) or such that light may be reflected by the light transmission adjustment unit (total reflection mode). In addition, if needed, the light transmittance of the light transmission adjustment unit may be adjusted to within 0% and 100% so that some of input light may be transmitted through the light transmission adjustment unit and some of the light may be reflected therefrom (partial reflection mode).

When, in the determining of the operation mode, it is determined that image capturing is to be performed, image capturing is performed (S120). In the performing of image capturing (S120), a photographing unit that is disposed on a reflected light path on which light that is reflected by the light transmission adjustment unit proceeds, generates an image data that represents an image by converting the light into an electrical signal.

In addition, when, in the determining of the operation mode, it is determined that a view finder function is to be performed, displaying of an image on the view finder unit (S130) is performed. In the displaying of an image on the view finder unit (S130), an image that is formed by light transferred from the light transmission adjustment unit is displayed on the view finder unit, which is disposed on the transmitted light path on which light that passes through the light transmission adjustment unit proceeds. In the displaying of an image on the view finder unit (S130), only an image formed by light transferred from the light transmission adjustment unit may be displayed, or image information or a figure that represents a focus may be overlaid with an image formed by light transferred from the light transmission adjustment unit.

As described above, in a photographing apparatus and method according to the one or more embodiments of the present invention, various functions, such as an image-capturing function and a view finder display function, may be selected and performed using a light transmission adjustment unit of which light transmittance is adjusted when a signal is applied to the light transmission adjustment unit.

In addition, a reflection unit that is disposed on one of a transmitted light path and a reflected light path of the light transmission adjustment unit is used so that a focusing function may be quickly performed while a compact design of the photographing apparatus is realized.

In addition, the light transmission adjustment unit may be used as an electronic shutter so that the number of elements of the photographing apparatus may be reduced.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A photographing apparatus comprising:
a lens unit;
a light transmission adjustment unit that is disposed on an optical axis on which light that passes through the lens unit proceeds, has an inclined position that may not be varied with respect to the optical axis, receives light that passes through the lens unit, and transmits the light with adjusted light transmittance;
an image sensor that is disposed on a reflected light path on which light that is reflected by the light transmission adjustment unit proceeds;
a view finder unit that is disposed on a straight line along a transmitted light path on which light that passes through the light transmission adjustment unit proceeds and displays an image formed by the light that passes through the light transmission adjustment unit, and
a controller that adjusts light transmittance of the light transmission adjustment unit by applying a signal to the light transmission adjustment unit,
wherein the view finder unit comprises:
an optical element that focuses light that passes through the light transmission adjustment unit to form the image of the view finder, and
a transparent display that is disposed at a position at which an image is formed by the light that passes through the light transmission adjustment unit, and selectively displays the image formed by the light that passes through the light transmission adjustment unit and an image formed in response to a signal applied from outside.

2. The photographing apparatus of claim 1, wherein the light transmission adjustment unit comprises one selected from the group consisting of an electrochromic device, a liquid crystal device, and a suspended particle device.

3. The photographing apparatus of claim 1, further comprising:
a reflection unit that is disposed between the view finder unit and the light transmission adjustment unit and is inclined with respect to the transmitted light path so as to reflect some light; and
a phase detection unit that receives the reflected light from the reflection unit and detects a phase difference between images formed by the reflected light.

4. The photographing apparatus of claim 3, wherein the reflection unit comprises one selected from the group consisting of an electrochromic device, a liquid crystal device, and a suspended particle device.

5. The photographing apparatus of claim 3, wherein the light transmission adjustment unit and the reflection unit are inclined with respect to an optical axis of the lens unit in opposite directions so that light that is reflected by the light transmission adjustment unit and light that is reflected by the reflection unit proceed in different directions.

6. The photographing apparatus of claim 1, wherein the view finder unit further comprises an eyepiece that is disposed at the position at which an image is formed by the light that passes through the light transmission adjustment unit, and the eyepiece displays the image formed by the light that passes through the light transmission adjustment unit.

7. The photographing apparatus of claim 1, wherein the view finder unit comprises a light blocking unit that blocks out light entering the photographing apparatus.

8. The photographing apparatus of claim 1, further comprising an image information display unit that is disposed adjacent to the view finder unit and that displays image information in response to a signal applied from outside.

9. The photographing apparatus of claim 1, wherein the view finder unit comprises a prism unit that transfers some of the light that passes through the light transmission adjustment unit in a first direction of the view finder unit and transfers a remaining portion of the light that passes through the light transmission adjustment unit in a second direction at an angle different from an angle of a path of light that is transferred from the light transmission adjustment unit.

10. The photographing apparatus of claim 9, further comprising a phase detection unit that receives light transferred from the prism unit and detects a phase difference between images formed by the transferred light from the prism unit.

11. The photographing apparatus of claim 10, wherein the view finder unit comprises an eyepiece that is disposed at a position at which an image is formed by the light transferred from the prism unit in the first direction and that displays the image formed by the light transferred from the prism unit in the first direction.

12. The photographing apparatus of claim 10, wherein the view finder unit further comprises a transparent display that is disposed at a position at which an image is formed by the light transferred from the prism unit in the first direction and that displays the image formed by the light transferred from the prism unit in the first direction or an image formed in response to a signal applied from outside.

13. The photographing apparatus of claim 1, wherein the controller controls the light transmission adjustment unit to operate in one of a total reflection mode in which the light transmission adjustment unit reflects light that passes through the lens unit, a transmission mode in which the light transmission adjustment unit transmits light that passes through the lens unit, and a partial reflection mode in which the light transmission adjustment unit reflects only some of light that passes through the lens unit.

14. The photographing apparatus of claim 13, wherein the controller controls the image sensor to capture a moving picture image or a still image, and the controller controls the light transmission adjustment unit in one of the total reflection mode and the partial reflection mode so that light is transferred to the image sensor while the moving picture image is captured by the image sensor.

15. The photographing apparatus of claim 1, further:
a main body that surrounds the image sensor and the light transmission adjustment unit, wherein the light transmission adjustment unit is inclined so as to reflect light toward one among four sides of the main body, and
the image sensor is disposed on one among the four sides of the main body so as to receive the light that is reflected by the light transmission adjustment unit.

16. The photographing apparatus of claim 1, further comprising:
a reflection unit that is disposed on the reflected light path and is inclined with respect to the reflected light path, reflects some of the light reflected from the light transmission adjustment unit, and transmits a remaining portion of the light reflected from the light transmission adjustment unit; and
a phase detection unit that receives the light transmitted from the reflection unit and detects a phase difference between images formed by the light transmitted from the reflection unit,
wherein the image sensor receives the light reflected from the reflection unit.

17. The photographing apparatus of claim 1, further comprising:
a reflection unit that is disposed on the transmitted light path on which light that passes through the light transmission adjustment unit proceeds and is inclined with respect to the transmitted light path so as to reflect some light and transmit a remaining portion of light; and
a phase detection unit that receives the light transmitted from the reflection unit and detects a phase difference between images formed by the light transmitted from the reflection unit,
wherein the view finder unit receives the light reflected from the reflection unit.

18. A photographing method comprising:
adjusting light transmittance of a light transmission adjustment unit that is disposed on an optical axis on which light that passes through a lens unit proceeds and has an inclined position that may not be varied with respect to the optical axis;
generating image data by converting light that is transferred from the light transmission adjustment unit by using an image sensor that is disposed on a reflected light path on which light that is reflected from the light transmission adjustment unit proceeds, and
selectively displaying an image that is formed by light transferred from the light transmission adjustment unit and an image formed in response to a signaled applied from outside on a view finder unit that is disposed on a straight line along a transmitted light path on which light that passes through the light transmission adjustment units proceeds,
wherein the light transmission adjustment unit and the image sensor are controlled by a controller, and the controller adjusts light transmittance of the light transmission adjustment unit by applying a signal to the light transmission adjustment unit, and wherein the view finder unit comprises:
- an optical element that focuses light that passes through the light transmission adjustment unit to form the image of the view finder, and
- a transparent display that is disposed at a position at which an image is formed by the light that passes through the light transmission adjustment unit, and selectively displays the image formed by the light that passes through the light transmission adjustment unit and an image formed in response to a signal applied from outside.

19. The photographing apparatus of claim 1, wherein the inclined position has an inclination angle between 90 and 180 degrees with respect to the optical axis.

20. The photographing method of claim 18, wherein the inclined position has an inclination angle between 90 and 180 degrees with respect to the optical axis.

21. The photographing apparatus of claim 19, wherein the photographing unit is disposed on the bottom of the photographing apparatus.

22. The photographing apparatus of claim 1, wherein the light transmission adjustment unit comprises one selected from the group consisting of a photochromic device and a thermochromic device.

23. The photographing apparatus of claim 3, wherein the reflection unit comprises one selected from the group consisting of a photochromic device and a thermochromic device.

* * * * *

UNITED STATES PATENT AND TRADEMARK OFFICE
CERTIFICATE OF CORRECTION

| | | |
|---|---|---|
| PATENT NO. | : 9,030,590 B2 | Page 1 of 1 |
| APPLICATION NO. | : 13/547284 | |
| DATED | : May 12, 2015 | |
| INVENTOR(S) | : Sang-tae Kim et al. | |

It is certified that error appears in the above-identified patent and that said Letters Patent is hereby corrected as shown below:

IN THE CLAIMS:

In Claim 15, Column 22, line 11, replace "The photographing apparatus of claim 1, further:" with -- The photographing apparatus of claim 1, further comprising: --

Signed and Sealed this
Twentieth Day of October, 2015

Michelle K. Lee
*Director of the United States Patent and Trademark Office*